US012646345B2

(12) United States Patent
Gopalakrishnan et al.

(10) Patent No.: US 12,646,345 B2
(45) Date of Patent: Jun. 2, 2026

(54) METHODS AND SYSTEMS FOR ADJUSTING TEXT COLORS IN SCANNED DOCUMENTS

(71) Applicant: XEROX CORPORATION, Norwalk, CT (US)

(72) Inventors: Sainarayanan Gopalakrishnan, Chennai (IN); Rajasekar Kanagasabai, Chennai (IN); Haripriya Chandran, Kulathur Chal (IN)

(73) Assignee: XEROX CORPORATION, Norwalk, CT (US)

( * ) Notice: Subject to any disclaimer, the term of this patent is extended or adjusted under 35 U.S.C. 154(b) by 527 days.

(21) Appl. No.: 17/866,864

(22) Filed: Jul. 18, 2022

(65) Prior Publication Data

US 2024/0020997 A1     Jan. 18, 2024

(51) Int. Cl.
| | |
|---|---|
| *G06K 9/00* | (2022.01) |
| *G06T 7/11* | (2017.01) |
| *G06V 30/12* | (2022.01) |
| *G06V 30/18* | (2022.01) |

(52) U.S. Cl.
CPC .......... *G06V 30/18105* (2022.01); *G06T 7/11* (2017.01); *G06V 30/12* (2022.01); *G06T 2207/10008* (2013.01)

(58) Field of Classification Search
CPC ............. G06V 30/18105; G06V 10/56; G06V 30/413; G06V 30/12; G06T 2207/10008; G06T 7/11; G06T 11/60; H04N 1/00; H04N 1/60; H04N 1/6027; G06F 3/04845
See application file for complete search history.

(56) References Cited

U.S. PATENT DOCUMENTS

| | | | |
|---|---|---|---|
| 6,987,882 B2 | 1/2006 | Curry et al. | |
| 8,335,379 B2 * | 12/2012 | Malik | H04N 19/20 |
| | | | 382/173 |
| 9,380,188 B1 * | 6/2016 | Nuuja | H04N 1/04 |
| 9,966,037 B2 | 5/2018 | Malik | |
| 2007/0201751 A1 * | 8/2007 | Wu | H04N 19/149 |
| | | | 382/232 |
| 2008/0291503 A1 * | 11/2008 | Gu | H04N 1/62 |
| | | | 358/452 |
| 2020/0028987 A1 * | 1/2020 | Gopalakrishnan ... | G06V 30/414 |

FOREIGN PATENT DOCUMENTS

JP          2019213024 A   * 12/2019

* cited by examiner

*Primary Examiner* — Gregory A Morse
*Assistant Examiner* — Kevin M Coomber
(74) *Attorney, Agent, or Firm* — MH2 Technology Law Group LLP

(57) ABSTRACT

The present disclosure discloses methods and systems for adjusting text colors in scanned documents. The method includes receiving a document for scanning from a user. Then, the document is scanned to generate scanned data. The scanned data is segmented into an image layer and one or more text layers, wherein the one or more text layers include textual content. Thereafter, the text color of the textual content in each text layer is identified. Then, the identified text color of the textual content in the text layer is compared with one or more pre-defined colors. Based on comparison, the text color of the textual content in each text layer is adjusted to match with the one or more pre-defined colors thereby generates a modified text layer. Finally, the modified text layer and the image layer are combined to create a final scanned document.

17 Claims, 7 Drawing Sheets
(1 of 7 Drawing Sheet(s) Filed in Color)

100

102

300

| | R | G | B |
|---|---|---|---|
| 301a | 110 | 130 | 150 |
| 301b | 180 | 120 | 100 |
| 301c | 10 | 50 | 50 |
| 301d | 30 | 90 | 70 |
| 301e | 80 | 70 | 90 |
| 301f | 90 | 210 | 80 |

320

322

324

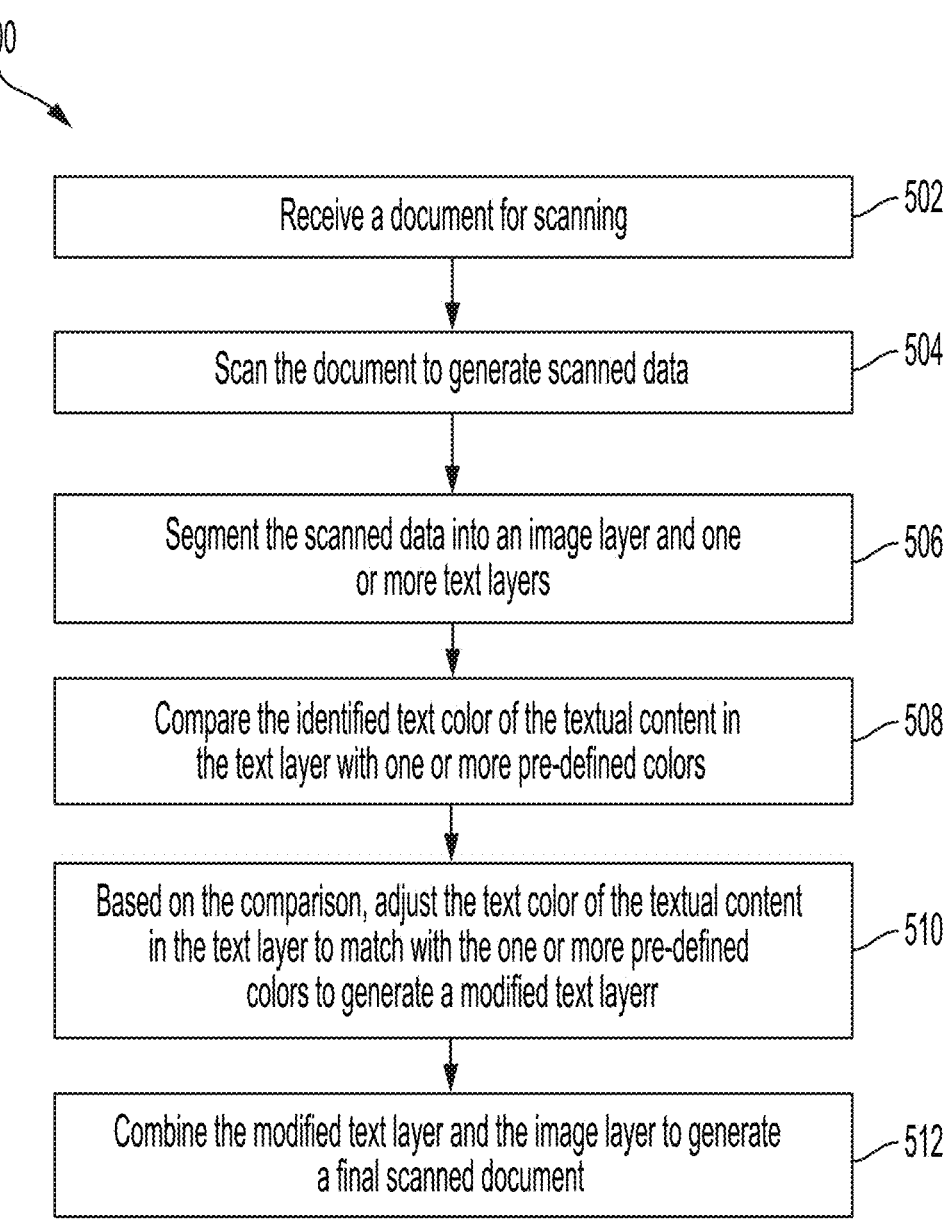

500

| Receive a document for scanning | — 502 |

| Scan the document to generate scanned data | — 504 |

| Segment the scanned data into an image layer and one or more text layers | — 506 |

| Compare the identified text color of the textual content in the text layer with one or more pre-defined colors | — 508 |

| Based on the comparison, adjust the text color of the textual content in the text layer to match with the one or more pre-defined colors to generate a modified text layerr | — 510 |

| Combine the modified text layer and the image layer to generate a final scanned document | — 512 |

FIG. 5

METHODS AND SYSTEMS FOR ADJUSTING TEXT COLORS IN SCANNED DOCUMENTS

TECHNICAL FIELD

The present disclosure relates to the field of scanning. More specifically, the disclosure relates to methods and systems for adjusting text colors in scanned documents.

BACKGROUND

Scanners have become quite common and essential in our day-to-day life. A user uses the scanners to scan documents and convert them into electronic documents for various reasons such as storage, sharing with other users, editing, or the like. One of the biggest challenges associated with the scanners is ensuring accuracy of colors reproduced by the scanners. For example, when a document is scanned using a scanner, content color in output scanned document does not match with the content color in the document submitted for scanning. Specifically, the appearance of text color in output scanned document does not match with the appearance of text color in the document submitted for scanning or with desired colors. This occurs due to various reasons, such as scanning artifacts, age of the scanner, lens quality of the scanner, etc. Further, scan output of different scanners varies. For example, if a document is scanned using different scanners, then the appearance of text colors in scanned documents generated by different scanners, is different. Due to variation in scanners same document can reproduce differentiation in color.

Additionally, it is seen that change in color appearance is more evident in the textual content of the document. The change in color appearance becomes a major concern when it is seen in important content such as logo of a company. While scanning, identifying the source of scanned documents remains a challenge that may further raise many authentication and security concerns.

In this light, there is a need for improved systems and methods for adjusting text colors while scanning.

SUMMARY

According to aspects illustrated herein, a method for adjusting text colors in scanned documents is disclosed. The method includes receiving a document for scanning from a user. Then, the document is scanned to generate scanned data. The scanned data is segmented into an image layer and one or more text layers. The one or more text layers include textual content. Thereafter, the text color of the textual content in each text layer is identified. Then, the identified text color of the textual content in the text layer is compared with one or more pre-defined colors, for each text layer. Based on the comparison, the text color of the textual content in the text layer is adjusted to match with the one or more pre-defined colors, thereby generates a modified text layer. Finally, the modified text layer and the image layer are combined to generate a final scanned document.

According to further aspects, a multi-function device for adjusting text colors in scanned documents is disclosed. The multi-function device includes: a receiver for receiving a document for scanning from a user; a scanner for scanning the received document to generate scanned data; and a color adjustment module for: segmenting the scanned data into an image layer and one or more text layers, wherein the text layers include textual content having one or more text colors; identifying the text color of the textual content in each text layer; comparing the identified text color of the textual content in the text layer with one or more pre-defined colors, for each text layer; based on the comparison, adjusting the text color of the textual content in the text layer to match with the one or more pre-defined colors to generate a modified text layer; and combining the modified text layer and the image layer to generate a final scanned document.

According to additional aspects illustrated herein, a non-transitory computer-readable medium storing instruction, which when executed by one or more processors cause the one or more processors to: receive a document for scanning from a user; scan the document to generate scanned data; segment the scanned data into an image layer and one or more text layers, wherein the text layers include textual content; identify text color of the textual content in each text layer; compare the identified text color of the textual content in the text layer with one or more pre-defined colors for each text layer; based on the comparison, adjust the text color of the textual content in the text layer to match with the one or more pre-defined colors to generate a modified text layer; and combine the modified text layer and the image layer to generate a final scanned document.

Other and further aspects and features of the disclosure will be evident from reading the following detailed description of the embodiments, which are intended to illustrate, not limit, the present disclosure.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

FIG. 5 is a method flowchart for adjusting text colors in scanned documents, in accordance with an embodiment of the present disclosure.

DESCRIPTION

Figure 1:
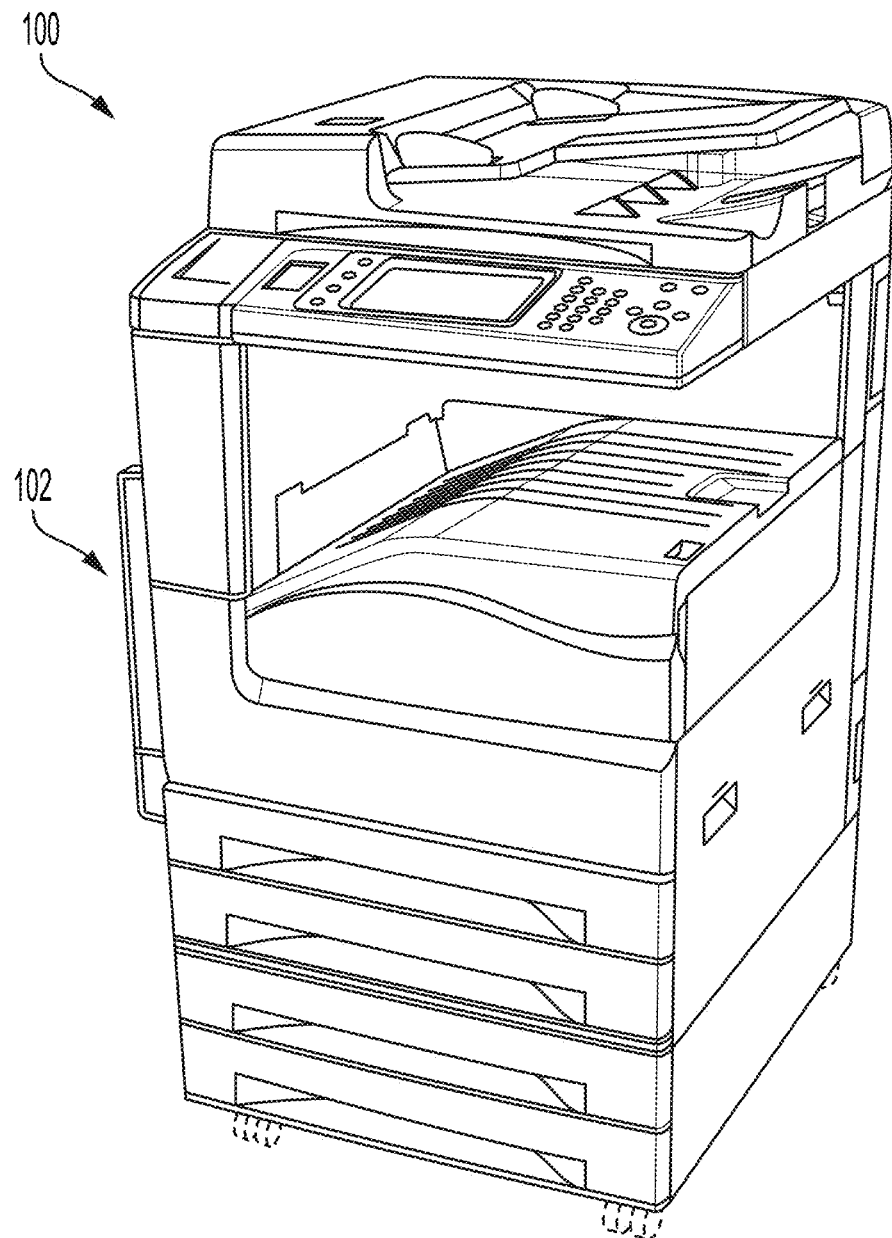
FIG. 1 shows an exemplary environment in which various embodiments of the present disclosure can be practiced.

A few inventive aspects of the disclosed embodiments are explained in detail below with reference to the various figures. Embodiments are described to illustrate the disclosed subject matter, not to limit its scope, which is defined by the claims. Those of ordinary skill in the art will recognize a number of equivalent variations of the various features provided in the description that follows.

NON-LIMITING DEFINITIONS

In various embodiments of the present disclosure, definitions of one or more terms that will be used in the document are provided below. For a person skilled in the art, it is understood that the definitions are provided just for the sake of clarity and are intended to include more examples in addition to the examples provided below.

The term "multi-function device" is a single device or a combination of multiple devices, to perform one or more functions such as, but not limited to, printing, imaging, scanning, copying, or the like. The multi-function device may include software, hardware, firmware, or a combination thereof. In context of the current disclosure, the multi-function device adjusts text color in scanned documents. Specifically, the multi-function device adjusts the text color in the scanned documents such that text color appearance (of critical colors) in scanned output matches with the text color appearance of pre-defined colors. The multi-function device adjusts the text color using a color look-up table that includes color values (intensity values) of the pre-defined colors, such as a color of company's logo or frequently occurring text colors.

The term "document" refers to a document submitted for scanning. The document includes different content such as textual content and non-textual content, i.e., graphics/image portion. The document submitted is in physical form such as printed on paper.

The term "scanned data" refers to raw scanned images generated upon scanning, where no image processing techniques are implemented. The scanned data refers to intermediate scanned images. The term "scanned document" refers to an output generated upon completion of scanning activity. The scanned document can be referred to as scanned output. The scanned document is in MRC file format such as PDF.

"Mixed or Multiple Raster Content (MRC) file format" is a format storing compressed images into at least two components, namely text layer component and an image layer. By storing the images into two different components, the most efficient and accurate compression algorithms can be used for each type of the components. MRC technique is used for optimizing the quality of scanned PDF's resulting in clearer graphics and sharper text characters with reduced file size.

"Image layer" is one of the layer components stored in the MRC file format. The image layer may be used for storing continuous-tone information, such as background attributes of an image, like pictures and/or smoothly varying background colors.

"Text layer" is one of the layer components stored in the MRC file format. Text layer may hold the color information corresponding to the text and/or line art found in the text layer.

The term "modified text layer" refers to a text layer generated after changing color values of textual content in accordance with the one or more pre-defined colors/color values.

The term "pre-defined color" refers to include frequently occurring colors at the multi-function device or colors which are used very often within an organization or by a particular user or a group of users. The pre-defined color can include a color of an organization's logo. In another example, the pre-defined color can be text colors used in various templates of documents/reports. The pre-defined color can be referred to as critical colors.

The term "color value" refers to an intensity value of a color. The color value can be defined in a suitable color space format such as Red-Green-Blue (RGB).

The term "threshold value" refers to a value that defines a maximum difference between color values of textual content in the document submitted for scanning and a color value of a pre-defined color. The difference further indicates a maximum allowable color difference that defines whether the color of the textual content in the document submitted for scanning can be considered close to the pre-defined color. In other words, the threshold value indicates whether the color of the textual content is close to the color of the pre-defined color or not. For example, if the difference is less than the threshold value, it indicates the color of the textual content is close to the color of the pre-defined color, accordingly, it is adjusted. If the difference is greater than the threshold value, it indicates the color of the textual content is not close to the color of the pre-defined color, and it is not adjusted. The threshold value is defined corresponding to each pre-defined color.

The term "color look-up table" refers to a table that includes at least one pre-defined color. The color look-up table further includes color values for all pre-defined colors and corresponding threshold values for each pre-defined color. For example, if there are 5 pre-defined colors, then there are 5 color values, where a color value corresponds to a pre-defined color, and 5 threshold values, where a threshold value corresponds to each pre-defined color and the color value.

The term "adjusting" refers to include changing or replacing text color of textual content of the document submitted for scanning with the pre-defined color. This is done by changing color value of textual content submitted for scanning with the color value of the pre-defined color.

The term "comparing" refers to comparing text color of textual content with one or more pre-defined colors. The comparison is performed to adjust the text color of the textual content in the submitted document. To accomplish this, color values of the text color of textual content is compared with the color values of the pre-defined colors and accordingly, the color values of the textual content are adjusted. Specifically, if the difference between the color values of the text color of textual content and the color values of the pre-defined colors is less than the threshold value, the color value of the text color is adjusted, else the color values are kept unchanged.

The term "match" is used in the context of adjusting the color of the textual content such that the color value of the textual content is same as the color value of the pre-defined color. In the context of the disclosure, if the color of the textual content is close to the pre-defined color, the color of the textual content is adjusted to match or made same as the color of the pre-defined colors. Matching ensures that the appearance of the text color in the textual content is consistent with the pre-defined color.

The term "close" is used in context of the text color of the textual content, where a color/color value of the textual content is considered "close" to a pre-defined color, if the difference between the color values of the textual content and the pre-defined color is less than the threshold value associated with the pre-defined color. When the text color of the textual content is found close to the pre-defined color, this indicates that the desired color of the textual content is the pre-defined color and hence the text color of the textual content is considered for adjustment.

The term "user" refers to a user who submits a document for scanning at the multi-function device. The user who submits the document for scanning can be the same user who defines the color look-up table at the multi-function device. But the user who submits a document for scanning can be different from the user who defines the color look-up table. For example, the user who defines/sets the color look-up table at the multi-function device can be any user of an organization or can be an admin user.

Overview

The present disclosure discloses methods and systems for adjusting text colors in scanned documents. The methods and systems adjust the text color to ensure the accuracy of text color with respect to a pre-defined color. The text color is adjusted using a pre-stored color look-up table that includes color values of the pre-defined colors. The pre-defined color includes color of a company logo, frequently used text color within an organization, such as a specific shade of grey or black, and so on. According to the implementation, the methods and systems identify textual content having color values close to the pre-defined color values. Once identified, the color values of the identified textual content are replaced with the pre-defined color values such that it is consistent with the pre-defined colors.

Exemplary Environment

FIG. 1 shows an exemplary environment 100 in which various embodiments of the disclosure can be practiced. The environment 100 includes a multi-function device 102. The multi-function device 102 provides one or more function-alities such as printing, scanning, imaging, copying, and so on. Although the environment 100 is shown to include the multi-function device 102 but the environment 100 can include a scanner. In context of the present disclosure, the multi-function device 102 manages text colors in scanned documents. Specifically, the multi-function device 102 adjusts text colors such that it matches with one or more pre-defined colors. The pre-defined colors are stored in a color look-up table.

The color look-up table is stored at the multi-function device 102. The color look-up table includes pre-defined colors and corresponding color values of the pre-defined colors. The pre-defined colors are identified based on the requirement of an organization, office site, employees of the organization. The pre-defined colors can be automatically defined by/at the multi-function device 102, can be defined by the user or a combination of these. Some examples of the pre-defined colors may include a color of company's logo such as Red and Grey, frequently occurring text colors such as specific shade/tone of grey or black that is mostly used in the body portion of reports/documents, a specific shade of red or blue that may be used in heading portion of reports/documents or the like. These are few examples of the pre-defined colors but there can be more examples of the pre-defined colors.

In implementation, a user accesses the multi-function device 102 and submits a document including textual content and/or non-textual content for scanning. The multi-function device 102 initiates scanning the document and generates scanned data. The multi-function device 102 first segments the scanned data into an image layer and one or more text layers. The image layer includes information related to a background portion and non-textual content/portion of the document. The text layer includes information related to the textual content of the document. Here, the information includes information related to each pixel form-ing the image layer and the text layer, respectively. For example, the information includes color values, i.e., color intensity values, for each pixel constituting the image layer and the text layer. Once the scanned data is segmented, the multi-function device 102 extracts the textual content from the text layer. Thereafter, the multi-function device 102 adjusts the text color of the textual content such that the adjusted color of the textual content matches with the pre-defined color. The matching ensures that the appearance of the text color of the textual content is consistent with the appearance of the pre-defined color. This process is repeated for each text layer such as extraction of textual content, adjustment of text color based on a threshold value and so on. Once adjusted, the multi-function device 102 generates an updated text layer.

Thereafter, the multi-function device 102 integrates the updated text layer including adjusted text color of the textual content and the image layer to generate a scanned output. The scanned output is in a suitable form, such as PDF. This way, the multi-function device 102 ensures the text color in the scanned output is same as the pre-defined color(s).

Exemplary Block Diagram

Figure 2:
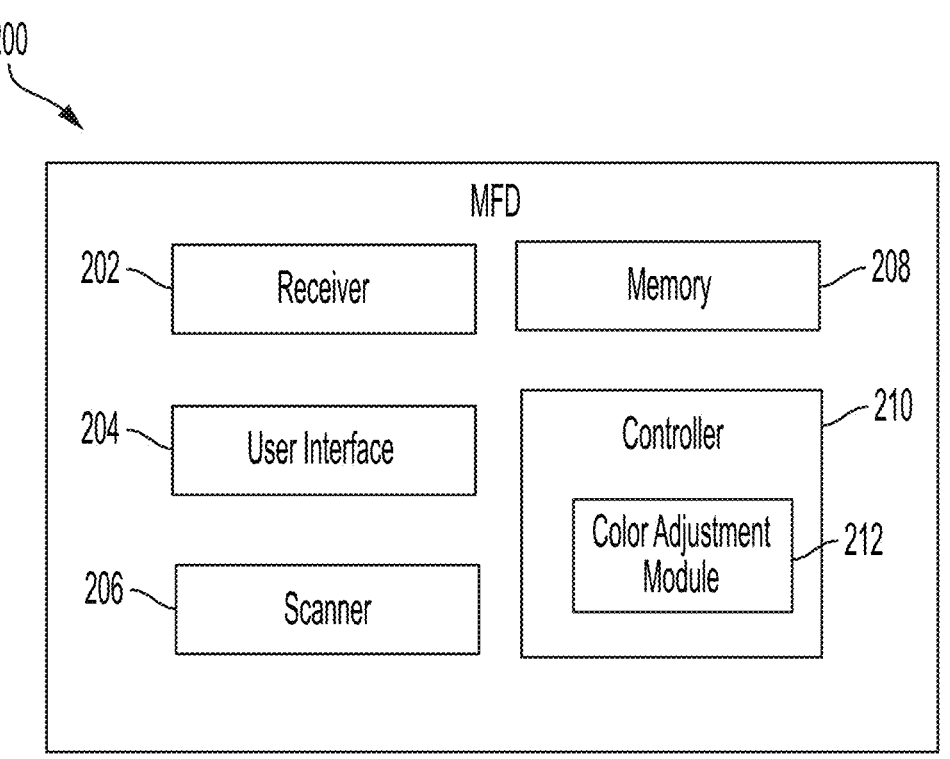
FIG. 2 is a block diagram illustrating various components of a multi-function device, in accordance with an embodiment of the present disclosure.

FIG. 2 is a block diagram illustrating various components of a multi-function device 200 for implementing the current disclosure. As shown, the multi-function device 200 includes a receiver 202 such as a platen or an automatic feeder, a user interface 204, a scanner 206, a memory 208, and a controller 210 including a color adjustment module 212. The components 202-212 are connected to each other via a conventional bus or a later developed protocol. And the components 202-212 communicate with each other for per-forming various functions of the present disclosure. The multi-function device 200 may further include additional component(s) as required to implement the present disclo-sure.

Initially, a color look-up table is defined at the multi-function device 200. The color look-up table can be defined before scanning or can be pre-set at the multi-function device 200. The color look-up table includes one or more pre-defined colors and, corresponding color values for each pre-defined color. To this end, the user first identifies the pre-defined colors. The pre-defined colors may include frequently occurring text colors, such as text color of com-pany logo, text colors used in various templates of docu-ments/reports, or the like. Once the pre-defined colors are identified, the color values, i.e., color intensity values of the pre-defined colors are determined. The color values can be represented in any desired color space, such as RGB (Red, Green and Blue), YCC/$YC_BC_R$ (where Y' is the luma com-ponent and $C_B$ and $C_R$ are the blue-difference and red-difference chroma components) or LAB (where L for light-ness and a and b for the color opponents green-red and blue yellow) color space.

Once the color values of the pre-defined colors are determined, the user then defines a threshold value corre-sponding to each pre-defined color. The threshold value defines a maximum difference between a color value of a text color in a scanned document and the color value of a pre-defined color. The threshold value can be calculated based on scan performance of the scanner. In one example, the threshold value can be calculated by comparing a text color, say text color of a logo (i.e., original/true color of the logo), in a document with a text color in scanned output. The threshold value can be different for different multi-function devices. The user may change the threshold value based the performance of the scanner 206, for example, if the perfor-mance of the scanner 206 degrades. The threshold value can be different for different color channels. For example, if a color value of a pre-defined color is in RGB color space format, then the threshold value can be different for each R channel, G channel and B channel. But the threshold value can be same for all the R, G, and B channels. This way, the pre-defined colors, corresponding color values and threshold values are determined for each pre-defined color. Finally, the color look-up table is then stored in the memory 208 of the multi-function device 200.

The details stored in the color look-up table may be configured and stored at the time of manufacturing the multi-function device 200 but the color look-up table can be configured and stored anytime later. The color values and the threshold values related to the pre-defined colors can be set by an admin user or can be set by any user with desired knowledge of the pre-defined colors.

Figure 3A:
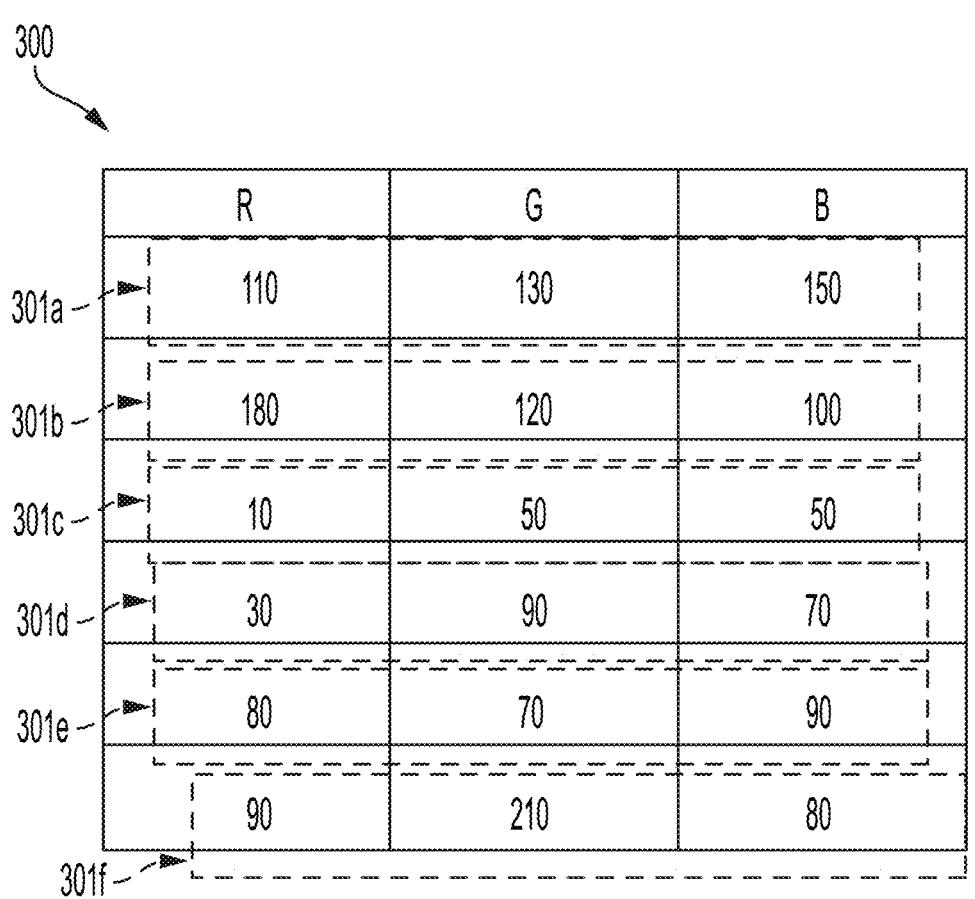
FIGS. 3A and 3B are exemplary snapshots illustrating implementation, in accordance with an embodiment of the present disclosure.

To set the color look-up table at the multi-function device 200, the user accesses the user interface 204. The user interface 204 displays a configuration option, e.g., device setting option, to allow the user to configure or change settings of the multi-function device 200. The user selects the device configuration option and once selected, the user interface 204 displays options to allow the user to configure and add the look-up table. For example, the user selects a colors space, say RGB color space, and inputs the color values of all the pre-defined colors. The user adds the threshold values corresponding to each pre-defined color, specifically corresponding to each color channel of each pre-defined color. Before storing the color look-up table in the memory 208, the controller 210 first identifies the color space selected by the user. Here, if the identified color space is RGB color space, the controller 210 directly stores the color look-up table. Otherwise, the controller 210 first converts the identified color space to the RGB color space and then stores the color look-up table at the multi-function device 200. One such exemplary color look-up table 300 is shown in FIG. 3A. As shown, the look-up table 300 includes one or more pre-defined colors such as 301a, 301b, 301c, 301d, 301e and 301f, collectively 301. The color look-up table 300 includes six pre-defined colors 301. Each pre-defined color 301 has a corresponding color value. For example, the pre-defined color 301a has a color value 110, 130 and 150, whereas the pre-defined color 301b has a color value 180, 120, and 100, the pre-defined color 301c has a color value 10, 50 and 50, the pre-defined color 301d has a color value 30, 90 and 70, the pre-defined color 301e has a color value 80, 70 and 90, and the pre-defined color 301f has a color value 90, 210 and 80. The color values are defined in RGB color space. The multi-function device 200 adjusts the color of the textual content whose color values are close/proximate to color values of the pre-defined colors 301 stored in the color look-up table 300.

The implementation begins when a user submits a document at the multi-function device 200, specifically at the receiver 202 of the multi-function device 200 for scanning. The document can be a multi-page document and the document include textual and non-textual content, such as images, graphics, etc. Thereafter, the user initiates scanning by selecting an option, say scan option. Once selected, the scanner 206 scans the submitted document and generates scanned data. The scanned data generated here refers to raw scanned images without implementing any image processing techniques. Once generated, the controller 210 sends the scanned data to the color adjustment module 212 for further processing.

Once received, the color adjustment module 212 first segments the received scanned data into multiple layers such as text layer or image layer. The image layer includes the background and non-textual content, while the text layer includes the textual content. The text layer is further segmented based on colors. For example, if the scanned data includes textual content in three different colors including violet, yellow, and grey, then three different text layers are formed, where each text layer represents a different color. For example, the first text layer represents all textual content in violet color, the second text layer represents textual content in yellow color and the third text layer represents textual content in grey color. Here, textual content in violet color can be grouped to form one text layer and so on. Accordingly, three different text layers are created based on the number of colors in the textual content. This way, the color adjustment module 212 segments the received scanned data into the image layer and one or more text layers. Further, the color adjustment module 212 obtains the image layer and the one or more text layers.

The color adjustment module 212 further considers the text layers for processing. For example, the color adjustment module 212 analyzes color values of each text layer. The color adjustment module 212 first extracts textual content from each text layer. The color adjustment module 212 then identifies color values of the textual content in the first text layer, specifically, the color adjustment module 212 identifies color values of pixels representing the textual content in the first text layer. The color adjustment module 212 then compares the identified color values of each pixel with color values included in the color look-up table to identify a difference between the color values. Thus, the color adjustment module 212 retrieves the color look-up table from the memory 208 to compare the color values. Thereafter, the color adjustment module 212 compares the identified difference with the threshold value (which corresponds to the color value of the look-up table with which the color value of the pixel is compared). If the difference is less than the threshold value, the color value of the pixel is adjusted (replaced) with the pre-defined color value, i.e., the color value of the look-up table with which the color value of the pixel is compared.

For instance, if the color value of a pixel is 120, 80, 90, the pre-defined color value stored in the look-up table is 122, 80, 90, a corresponding threshold value is '2', then, upon comparison, the color adjustment module 212 replaces the previous color value of the pixel, i.e., 120, 80, 90, with the pre-defined color value, i.e., 122, 80, 90. But if the difference is greater than the threshold value, the color value of the pixel is kept unchanged. If the color value of a pixel is 120, 80, 90, the color value stored in the look-up table is 125, 80, 90, further a corresponding threshold value is '2', then, upon comparison, the color adjustment module 212 keeps the color value of the pixel unchanged, i.e., the color value of the pixel remains the same i.e., 120, 80, 90.

Additionally, if the look-up table includes multiple pre-defined colors and color values, then the color adjustment module 212 compares the color value of each pixel with each color value of the look-up table one by one. Further, every time after comparing, the color adjustment module 212 compares the difference with the corresponding threshold value, and if the difference is less than the threshold value, the color value is adjusted. This way, all pixels representing the textual content in the first text layer are analyzed. This continues till the color value of the pixel is compared with all the color values in the look-up table. Similarly, the color adjustment module 212 repeats these aspects for each text layer. For example, the controller 210 identifies color values, determines the difference, compares threshold values and adjusts the color value of the pixels. This way, the color adjustment module 212 adjusts the color value of those pixels/textual content whose color value is close/proximate to the color value of the pre-defined color stored in the look-up table. Thus, the color adjustment module 212 changes the text color in the text layer and creates a modified text layer.

Specifically, the color adjustment module 212 compares the color values for each pixel of the textual content with the color values stored in the color look-up table. And if the difference is less than a threshold value, e.g., 1, 2, 3, etc., the color adjustment module 212 replaces the color value of that pixel with the color value of the pre-defined color. This way, the color adjustment module 212 adjusts the color of all the pixels of the textual content in the text layer. Thus, the color adjustment module 212 obtains a modified text layer with the adjusted text color. The color adjustment module 212 sends the image layer and the modified text layer to the controller 210 for further processing. The modified text layer includes the adjusted text color of the textual content corresponding to each layer, as discussed above.

Once received, the controller 210 first compresses the modified text layer and the image layer. To accomplish this, the controller 210 compresses the modified text layer using one or more text compressing algorithms. In one example, the controller 210 compresses the modified text layer using lossless compression algorithms, such as JBIG2. The controller 210 compresses the image layer using one or more image compression algorithms. In one example, the image layer is compressed using lossy compression algorithms, such as JPEG. Thereafter, the controller 210 combines the image layer and the modified text layer(s) to create a single scanned document in a pre-defined format such as PDF document.

Finally, the scanned document is displayed to the user via the user interface 204. Once displayed, the user can perform a desired action, such as print the scanned document, email the scanned document to one or more users or himself, store the scanned document in a cloud location, and so on.

Continuing with FIG. 2 description, the user interface 204 displays various options and/or information to the user for implementing the present disclosure. For example, the user interface 204 displays a configuration option, e.g., device setting option, to allow the user to configure or change settings of the multi-function device 200. In another example, the user interface 204 displays options to allow the user to configure and add the look-up table. The user interface 204 can be used for providing inputs by the user and/or displaying information to the user.

The memory 208 stores all relevant information required for implementing the current disclosure. For example, the memory 208 stores the color look-up table including pre-defined colors, color values of all the pre-defined colors and a threshold value associated with each pre-defined color. Further, any details stored in the memory 208 may be retrieved by the controller 210, the color adjustment module 212, or by any other modules of the multi-function device 200 for implementing the current disclosure.

Exemplary Snapshots

Figure 3B:
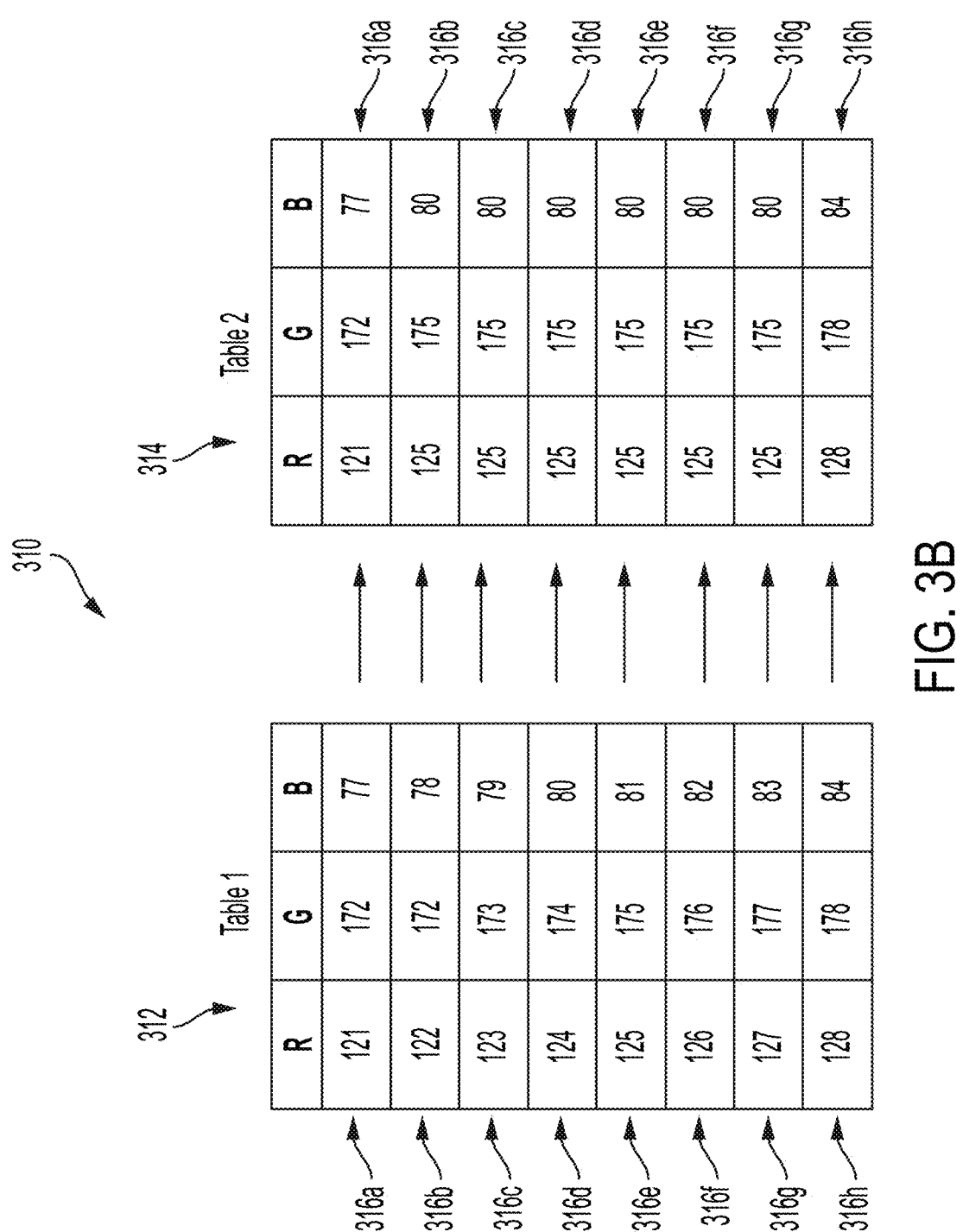

FIG. 3B illustrates an exemplary snapshot 310 for implementing the current disclosure. As illustrated, the snapshot 310 includes two tables, i.e., table 1 labeled as 312 and table 2 labeled as 314. The table 1 312 includes color values of textual content in a text layer before text color adjustment. Specifically, the table 1 (marked as 312) includes different color values for pixels forming the textual content in the text layer as 316a, 316b, 316c, 316d, 316e, 316f, 316g and 316h (collectively 316). The table 2 (marked as 314) includes color values of textual content of the text layer after text color adjustment. Here, it can be considered that a color value of a pre-defined color is 125, 175, 80 (in RGB color space) and a threshold value is 3. The color values 316 as in the table 1 (marked as 312) are compared with color values such as 125, 175, 80 of the pre-defined color. Based on the comparison, color values of the table 1 (marked as 312) are adjusted. For example, if the difference between color values 316 of the table 1, 312 and the color value of the pre-defined color is less than the threshold value, for example 3, the color values for those pixels are adjusted.

Referring to the table 1 (marked as 312) and the table 2 (marked as 314), it can be seen that for all the color values of the table 1 (marked as 312) for which difference with the color value of the pre-defined color is less than or equal to 3, the color value is changed to the color value of the pre-defined color, i.e., 125, 175, 80. As illustrated in table 2 (marked as 314), color values for pixels 316b, 316c, 316d, 316e, 316f and 316g are changed to the color value of the pre-defined color i.e., 125, 175, 80. But, for the color values for pixels 316a and 316h, for which the difference is greater than 3, the color values are not changed. As can be seen from FIG. 3B, color values of pixels 316a and 316h are not changed.

Figures 3C, 3D, 3E:
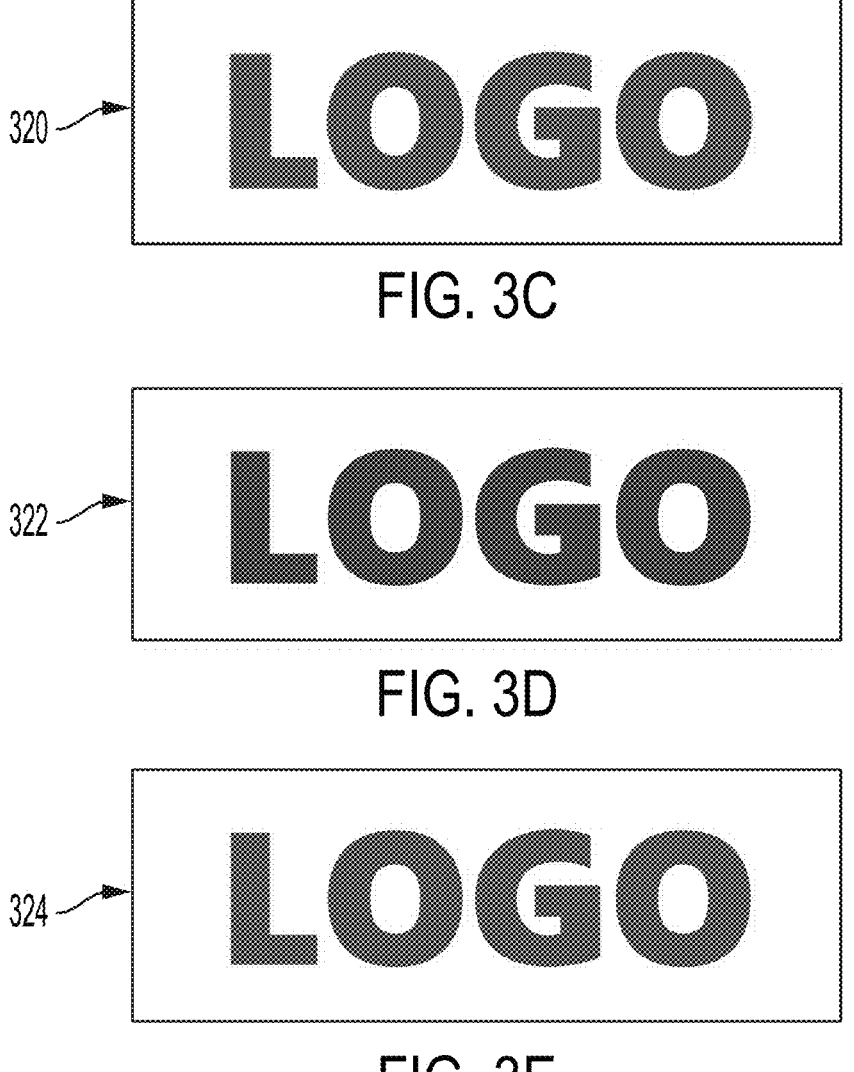
FIG. 3C shows an input image.
FIG. 3D shows an output image generated without color adjustment.
FIG. 3E shows an output image generated upon color adjustment according to the implementation of the present disclosure.

FIGS. 3C, 3D and 3E represent snapshots illustrating an exemplary implementation. The snapshot 320 of FIG. 3C shows an input image where the input image includes/indicated a pre-defined color. For easy discussion, the pre-defined color is shown with the help of image 320. FIG. 3D shows an output image 322 generated by a multi-function device, whereas FIG. 3E shows an output image 324 generated by a different multi-function device than used to generate the output image 322 of FIG. 3D. The output image 324 of FIG. 3E is generated after color adjustment according to the present disclosure, but the output image 322 of FIG. 3D is generated without any color adjustment. Further, upon comparing the input image 320 with the output image 322, it is observed that the text color of the textual content in the output image 322 is different from the text color of the textual content in the input image 320. But upon comparing the input image 320 and the output image 324 generated in accordance with the present disclosure, it is clear that the text color of textual content (see FIG. 3E) matches with the pre-defined color as in the input image 320. Thus, implementing the present disclosure ensures that text color appearance in the output image 324 is consistent with the text color appearance of the pre-defined color.

Exemplary Workflow

Figure 4:
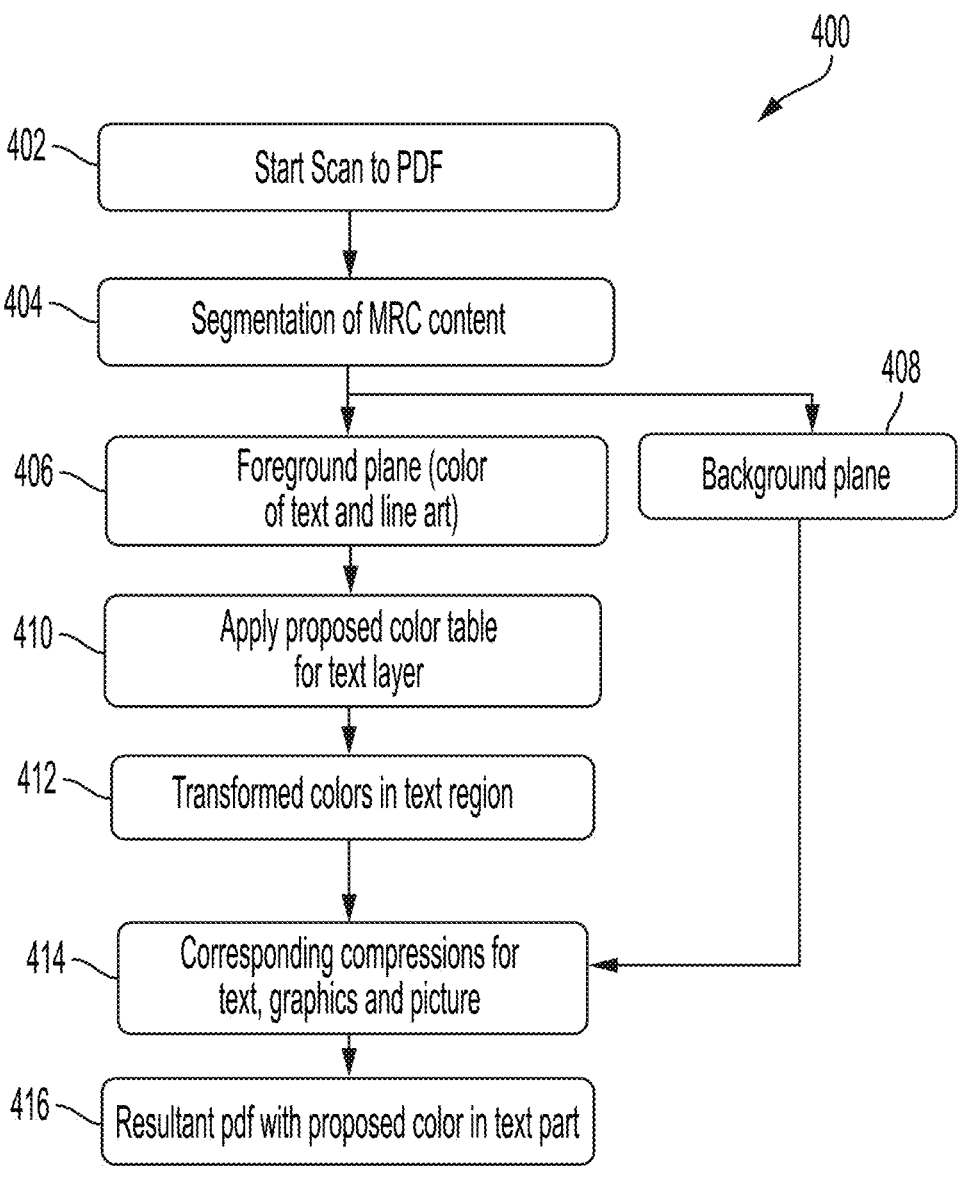
FIG. 4 is a process flow involved in adjusting text colors in scanned documents, in accordance with an embodiment of the present disclosure.

FIG. 4 shows an exemplary scan workflow 400 for adjusting text colors in scanned documents. The scan workflow 400 begins when a user submits a document for scanning. Once submitted, at 402 user initiates scan to PDF to obtain a scanned output in the PDF format. Once initiated, the document is scanned, and a corresponding scanned data is generated. Thereafter, at 404, mixed raster content (MRC), i.e., textual and non-textual content of the scanned data is segmented into a foreground layer (at 406) and a background layer (at 408). The foreground layer represents a text layer which further includes textual content and line arts, and the background layer includes an image layer which further includes non-textual content such as background and pictures/graphics. Once segmented, at 410, a color look-up table including one or more pre-defined colors is applied to the text layer. In detail, text color of the text layer is compared with the pre-defined colors stored in the look-up table. Based on comparison, at 412, the text color of the text layer is transformed. Once text color is transformed, a modified text layer is obtained. Thereafter, at 414, the foreground layer including the modified text layer and the background layer including the image layer are compressed using one or more different compression techniques. Once compressed, at 416, both the foreground layer and the background layer are combined, and a resultant PDF document is created with proposed color in the modified text layer.

Exemplary Flowchart

FIG. 5 is a method 500 for adjusting text colors in the scanned documents. The method 500 may be implemented at a multi-function device, such as the multi-function device 102 of FIG. 1, or the multi-function device 200 of FIG. 2. However, the method 500 may be implemented at any equivalent device with scanning functionality, image segmentation functionality, and so on.

Initially, a color look-up table is created and stored at the multi-function device. The color look-up table includes color values of one or more pre-defined colors. Here, a user first identifies the pre-defined colors and corresponding color values. The pre-defined colors may include frequently occurring text colors, such as text color of company logo, text colors used in various templates of documents/reports, or the like. Once the pre-defined colors and corresponding color values are identified, the user further defines a threshold value corresponding to each pre-defined color. The threshold value defines a maximum difference between a color value of textual content and a color value of a pre-defined color. Alternatively, the threshold value can be calculated/defined based on scan performance of the multi-function device. Further, the threshold value can be different for different color channels. For example, the threshold value can be different for each color channels such as Red (R) channel, Green (G) channel and Blue (B) channel. This way, the pre-defined colors and information related to the pre-defined color, i.e., color values and corresponding threshold values are determined for each critical color. The user can add the color values of the pre-defined colors in any desired color space, e.g., RGB color space, CIELAB color space, $YC_BC_R$ color space. For easy discussion, the pre-defined colors, color values and threshold values are discussed in RGB color space, but other color spaces can also be implemented.

The implementation begins when a user submits a document for scanning at the multi-function device. The document is a physical document including content in the form of text, image, graphics, or the like. At 502, the document is received for scanning. Thereafter, the user initiates scanning, say by selecting a scan option provided on the multi-function device or otherwise via a user interface of the multi-function device.

Once initiated, at 504, the document is scanned, and corresponding scanned data is generated. The scanned data refers to raw images generated upon scanning the document. At 506, the scanned data is segmented into an image layer and one or more text layers. The scanned data includes different data such as textual content, non-textual content (images) and background (blank page) in pixels format. The scanned data is segmented into an image layer and one or more text layers. The image layer includes the background and non-textual content, while the text layer includes the textual content. Then, the text color of the textual content is identified. In detail, upon segmentation, an image layer, and one or more text layers and mask layers are obtained. The mask layer is generated corresponding to each text layer and the mask layer includes color information of a corresponding text layer. The color information included in the mask layer is used to identify the text color of the textual content. Once identified, the textual content is extracted from the text layer.

Further, the text layers are segmented based on the number of colors in the textual content. For example, if the textual content includes 5 different colors such as Blue, Yellow, Green, Purple, and Orange, then 5 different text layers are obtained, wherein each text layer corresponds to a particular color. This way, the received scanned data is segmented into the image layer and the one or more text layers. After identifying the text color, color values of the textual content in each text layer are identified. For easy discussion, the method 500 is discussed further with respect to one text layer but the method 500 can be repeated if the segmented data includes more than one text layer.

At 508, text color of the textual content in the text layer is compared with the one or more pre-defined colors stored in the color look-up table. Specifically, color values of each pixel of the textual content are compared with the color values corresponding to the pre-defined colors included in the color look-up table to identify a color difference. Then, the color difference is compared with a corresponding threshold value associated with the pre-defined colors. Here, the threshold value corresponds to the color value of a pre-defined color in the look-up table with which the color value of the textual content is compared.

If the color difference is less than a threshold value, then the text color of the textual content in the text layer is adjusted to match with the one or more pre-defined colors at 510. Specifically, the text color of the textual content is replaced with the one or more pre-defined colors, if the color difference is less than a threshold value. The color value of the textual content is replaced with the color value of the pre-defined color with which it is compared. Once replaced, a modified text layer is obtained.

If the color difference is greater than a threshold value, then the color value of the textual content is kept as-is. The color values of the textual content close/proximate to color values of the one or more pre-defined colors are considered for color adjustment.

If the color look-up table includes multiple color values, then the color value of textual content (pixel corresponding to textual content) is compared with each color value of the look-up table one by one. Post comparison, as discussed earlier, a color difference is identified, and the identified difference is compared with a threshold value (which corresponds to the pre-defined color with which the color value of the pixel is compared). Here, if the difference is less than the threshold value, the color value is changed and then the next pixel is analyzed. Else, the color value of the pixel is compared with the next color value of the look-up table. This continues till all the color values in the color look-up table are compared and further the process is repeated for each text layer generated from the segmentation. This way, the text color in the text layer is changed and thus, a modified text layer is obtained. The modified text layer includes adjusted text color of the textual content.

Once created, at 512, the modified text layer and the image layer are combined to create a scanned document. The scanned document is in any suitable format such as PDF. Before combining, the image layer and the modified text layer can be compressed using any suitable compressing algorithms/technique. For example, the modified text layer is compressed using lossless compression algorithms, such as JBIG2. The image layer is compressed using one or more image compression algorithms. For example, the image layer is compressed using lossy compression algorithms, such as JPEG. Thereafter, the compressed text layer and the image layer are combined and a scanned document is generated. This way, the scanned document is generated. Once generated, the scanned document is displayed to the user for a desired action. For example, the user can perform any desired action, such as email, print, save to a cloud location, or the like. This way, the scanned document is sent to one or more destinations.

The method 500 can be implemented in the form of non-transitory computer-readable medium. The non-transitory computer-readable medium stores instruction, which when executed by one or more processors cause the one or more processors to: receive the document for scanning from a user; scan the document to generate scanned data; segment the scanned data into an image layer and one or more text layers, wherein the one or more text layers include textual content; identify text color of the textual content in each text layer; for each text layer, compare the identified text color of the textual content in the text layer with one or more pre-defined colors; based on the comparison, adjust the text color of the textual content in the text layer to match with the one or more pre-defined colors, thereby, generating a modified text layer; and combine the modified text layer and the image layer to generate a final scanned document.

The non-transitory computer-readable medium further includes instructions executable by the processing resource to compare the calculated color values of the textual content in the text layer with color values of the one or more pre-defined color values to identify a difference. The non-transitory computer-readable medium further includes instructions executable by the processing resource to replace the text color of the textual content with the one or more pre-defined colors if the difference is less than a threshold value.

The present disclosure discloses methods and systems for adjusting text colors of textual content in the scanned documents. The text colors are adjusted such that it matches with pre-defined colors of an organization as set or as set by a user. The methods and systems ensure accuracy of text color in scanned documents as well as ensure consistent appearance of the text colors with respect to the pre-defined colors. The methods and systems identify textual content having colors close to the pre-defined colors and replace those colors of the identified textual content with the pre-defined colors. The methods and systems allow a user to store a color look-up table including the pre-defined colors. The same look-up table can be stored in other scanning devices, such as multi-function devices, of an organization or a site, so that scan output of all the multi-function devices is consistent, specifically the appearance of pre-defined color is consistent in scan output of all the multi-function devices. This way, the methods and systems ensure that the appearance of the pre-defined color is same or consistent throughout the site or the organization.

The methods and systems help identify a source of the scanned document based on the color look-up table. This may resolve several authentication and security needs. For example, by identifying the unique color look-up table, the source of the scanned document can be tracked, and all documents scanned in the organization can have a uniform color appearance.

The methods and systems provide an option to swap or change the actual colors, specifically, in text layers.

The methods and systems propose color adjustments only for text layers in MRC documents considering that the differentiation of colors in text layers is very well noticed from one scanner to the other.

The order in which the method is described is not intended to be construed as a limitation, and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof. However, for ease of explanation, in the embodiments described below, the method may be considered to be implemented in the above-described system and/or the apparatus and/or any electronic device (not shown).

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

Note that throughout the following discussion, numerous references may be made regarding servers, services, engines, modules, interfaces, portals, platforms, or other systems formed from computing devices. It should be appreciated that the use of such terms is deemed to represent one or more computing devices having at least one processor configured to or programmed to execute software instructions stored on a computer readable tangible, non-transitory medium or also referred to as a processor-readable medium. For example, a server can include one or more computers operating as a web server, database server, or other type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as receiving, scanning, identifying, extracting, adjusting, storing, or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in a transitory media, such as a transmittable carrier wave in which the control program is embodied as a data signal using transmission media, such as acoustic or light waves, such as those generated during radio wave and infrared data communications, and the like.

The terminology used herein is for the purpose of describing particular embodiments only and is not intended to be limiting of the disclosure. It will be appreciated that several of the above disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for adjusting text colors in scanned documents, the method comprising:
   receiving a document for scanning from a user;
   scanning the document to generate scanned data in a mixed or multiple raster content file format using an electronic scanner;
   segmenting the scanned data into a background layer comprising an image layer and a foreground layer comprising one or more text layers, wherein the one or more text layers comprise textual content;
   identifying text color intensity values of pixels representing the textual content in each text layer;
   calculating the text color intensity values associated with the textual content in each text layer based on scan performance of the electronic scanner;
   for each text layer, comparing the text color intensity values of each pixel of the textual content that are identified and calculated in the text layer with one or more pre-defined colors, wherein the one or more pre-defined colors represent frequently appearing text colors in documents and text colors of one or more templates of documents or reports at a multi-function device;
   based on the comparison, adjusting the text color intensity values of each pixel of the textual content in the text layer to match with the one or more pre-defined colors, thereby, generating a modified text layer; and
   combining the modified text layer and the image layer to generate a final scanned document.

2. The method of claim 1, further comprising, storing the one or more pre-defined colors in a color look-up table.

3. The method of claim 1, further comprising, extracting the textual content from each text layer.

4. The method of claim 1, further comprising, comparing the text color intensity values of the textual content in each text layer that are calculated with color intensity values of the one or more pre-defined color intensity values to identify a difference.

5. The method of claim 4, further comprising, comparing the difference that is identified with a threshold value associated with the one or more pre-defined colors.

6. The method of claim 4, further comprising, if the difference is less than a threshold value, then replacing a text color intensity value of the text color intensity values of a pixel of the pixels of the textual content with the one or more pre-defined colors.

7. The method of claim 4, wherein the text color intensity values of the textual content close to color intensity values of the one or more pre-defined colors are considered for color adjustment.

8. A multi-function device for adjusting text colors in scanned documents, the multi-function device comprising:
   a receiver for receiving a document from a user for scanning;
   an electronic scanner for scanning the received document to generate scanned data in a mixed or multiple raster content file format; and
   a color adjustment module for:
   segmenting the scanned data into a background layer comprising an image layer and a foreground layer comprising one or more text layers, wherein the one or more text layers comprise textual content having one or more text colors;

identifying text color intensity values of pixels representing the textual content in each text layer;

calculating the text color intensity values associated with the textual content in each text layer based on scan performance of the electronic scanner;

for each text layer, comparing the text color intensity values of each pixel of the textual content that are identified and calculated in the text layer with one or more pre-defined colors, wherein the one or more pre-defined colors represent frequently appearing text colors in documents and text colors of one or more templates of documents or reports at a multi-function device;

based on the comparison, adjusting the text color intensity values of each pixel of the textual content in the text layer to match with the one or more pre-defined colors, thereby, generating a modified text layer; and combining the modified text layer and the image layer to generate a final scanned document.

9. The multi-function device for adjusting text colors in scanned documents of claim 8 further comprises a memory to store at least one of: the one or more pre-defined colors, color intensity values associated with the one or more pre-defined colors and threshold values corresponding to each pre-defined color.

10. The multi-function device of claim 8, wherein the color adjustment module extracts the textual content in each text layer.

11. The multi-function device for adjusting text colors in scanned documents of claim 8, wherein the color adjustment module compares the text color intensity values of the textual content in each text layer that are calculated with color intensity values of the one or more pre-defined color intensity values to identify a difference.

12. The multi-function device for adjusting text colors in scanned documents of claim 11, wherein the color adjustment module compares the difference that is identified with a threshold value associated with the one or more pre-defined colors.

13. The multi-function device for adjusting text colors in scanned documents of claim 11, wherein the color adjustment module, if the difference is less than a threshold value, then replaces a text color intensity value of the text color intensity values of a pixel of the pixels of the textual content with the one or more pre-defined colors.

14. The multi-function device for adjusting text colors in scanned documents of claim 8, wherein the color adjustment module adjusts text color intensity values of the textual content close to color intensity values of the one or more pre-defined colors.

15. A non-transitory computer-readable medium storing instruction, which when executed by one or more processors cause the one or more processors to:

receive a document for scanning from a user;

scan the document to generate scanned data in a mixed or multiple raster content file format using an electronic scanner;

segment the scanned data into a background layer comprising an image layer and a foreground layer comprising one or more text layers, wherein the one or more text layers comprise textual content;

identify text color intensity values of pixels representing the textual content in each text layer;

calculating the text color intensity values associated with the textual content in each text layer based on scan performance of the electronic scanner;

for each text layer, compare the text color intensity values of each pixel of the textual content that are identified and calculated in the text layer with one or more pre-defined colors, wherein the one or more pre-defined colors represent frequently appearing text colors in documents and text colors of one or more templates at a multi-function device;

based on the comparison, adjust the text color intensity values of each pixel of the textual content in the text layer to match with the one or more pre-defined colors, thereby, generating a modified text layer; and combine the modified text layer and the image layer to generate a final scanned document.

16. The non-transitory computer-readable medium of claim 15 comprising instructions executable by the processing resource to compare text color intensity values of the textual content that are calculated in each text layer with color intensity values of the one or more pre-defined color intensity values to identify a difference.

17. The non-transitory computer-readable medium of claim 16 comprising instructions executable by the processing resource to replace a text color intensity value of the text color intensity values of a pixel of the pixels of the textual content with the one or more pre-defined colors, if the difference is less than a threshold value.

* * * * *